United States Patent
Harris

(10) Patent No.: US 7,226,259 B2
(45) Date of Patent: *Jun. 5, 2007

(54) LOCKING FASTENER ASSEMBLY

(75) Inventor: David A. Harris, Fulton, IL (US)

(73) Assignee: MacLean-Fogg Company, Mundelein, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/688,173

(22) Filed: Oct. 17, 2003

(65) Prior Publication Data

US 2004/0086354 A1 May 6, 2004

Related U.S. Application Data

(63) Continuation of application No. 09/933,312, filed on Aug. 20, 2001, now Pat. No. 6,749,386.

(51) Int. Cl.
*F16B 39/24* (2006.01)

(52) U.S. Cl. ............ 411/150; 411/161; 411/188; 411/544

(58) Field of Classification Search .......... 411/149, 411/150, 160, 161, 187, 188, 189, 533, 544

See application file for complete search history.

(56) References Cited

U.S. PATENT DOCUMENTS

| | | | | |
|---|---|---|---|---|
| 292,063 A | * | 1/1884 | Shailer | 411/144 |
| 367,196 A | * | 7/1887 | Love | 411/186 |
| 738,217 A | * | 9/1903 | Miner | 411/136 |
| 752,628 A | * | 2/1904 | Miner | 411/188 |
| 827,562 A | * | 7/1906 | Fleischmann | 411/136 |
| 889,563 A | * | 6/1908 | Morgan | 75/762 |
| 889,593 A | * | 6/1908 | Fleischmann | 411/161 |
| 948,326 A | * | 2/1910 | Hesse | 411/143 |
| 1,015,059 A | * | 1/1912 | Morgan | 411/301 |
| 1,040,215 A | * | 10/1912 | Kiner | 411/197 |
| 1,140,974 A | * | 5/1915 | Formby | 411/115 |
| 1,297,845 A | * | 3/1919 | Hawrylasz | 411/330 |
| 1,622,581 A | * | 3/1927 | Gunkel | 411/138 |
| 1,952,305 A | * | 3/1934 | Beck | 411/188 |

(Continued)

FOREIGN PATENT DOCUMENTS

DE 298 15 492 U * 12/1998

(Continued)

*Primary Examiner*—Flemming Saether
(74) *Attorney, Agent, or Firm*—Dana Andrew Alden

(57) ABSTRACT

A locking fastener assembly comprising a nut and a washer. The nut and washer each have opposed load bearing surfaces which include a series of annularly extending, slightly inclined faces forming shallow undulations around each surface. The load bearing surface on the nut is generally spherically convex and the load bearing surface on the washer is generally spherically concave. The nut rotates as it is installed while the washer is prevented from rotating so that the undulating bearing surface on the nut slides over the undulating bearing surface on the washer against ever increasing resistance until the assembly is properly seated and the nut is effectively prevented from counter-rotating by interference between opposed, inclined faces. A concave clamping surface is formed on the outer end of the washer on a radially extending flange. The flange flexes when the assembly is installed and resiliently urges the washer against the nut.

9 Claims, 4 Drawing Sheets

U.S. PATENT DOCUMENTS

| | | | | |
|---|---|---|---|---|
| 2,210,455 A | * | 8/1940 | Hosking | 411/187 |
| 2,253,241 A | * | 8/1941 | MacDonald | 411/186 |
| 2,278,062 A | * | 3/1942 | De Koharovich | 411/144 |
| 2,498,221 A | * | 2/1950 | Poupitch | 411/134 |
| 2,562,032 A | * | 7/1951 | Gutensohn | 411/167 |
| 2,779,379 A | * | 1/1957 | Willis | 152/225 R |
| 2,783,810 A | * | 3/1957 | Wrigley | 411/136 |
| 3,077,218 A | * | 2/1963 | Ziegler | 411/155 |
| 3,078,899 A | * | 2/1963 | Kuffel et al. | 411/185 |
| 3,352,344 A | * | 11/1967 | Lanius, Jr. | 411/145 |
| 3,417,802 A | * | 12/1968 | Oldenkott | 411/134 |
| 3,438,416 A | * | 4/1969 | Thurston | 411/134 |
| 3,693,685 A | * | 9/1972 | Onufer | 411/168 |
| 3,851,690 A | * | 12/1974 | Wing et al. | 411/190 |
| 3,942,570 A | * | 3/1976 | Bochman et al. | 411/220 |
| 4,034,788 A | * | 7/1977 | Melone | 411/134 |
| 4,231,281 A | * | 11/1980 | Reinwall, Jr. | 411/371.2 |
| 4,339,179 A | * | 7/1982 | Dany | 351/153 |
| 4,377,361 A | * | 3/1983 | Frieberg | 411/161 |
| 4,431,353 A | * | 2/1984 | Capuano | 411/11 |
| 4,793,752 A | * | 12/1988 | Frieberg | 411/161 |
| 4,812,095 A | * | 3/1989 | Piacenti et al. | 411/188 |
| 4,941,787 A | * | 7/1990 | Shaffer | 411/136 |
| 5,141,374 A | * | 8/1992 | Olofsson | 411/141 |
| 5,409,338 A | * | 4/1995 | McKinlay | 411/149 |
| 5,626,449 A | * | 5/1997 | McKinlay | 411/149 |
| 5,984,602 A | * | 11/1999 | Park | 411/154 |
| 6,135,689 A | * | 10/2000 | Matsunami | 411/311 |
| 6,776,565 B2 | * | 8/2004 | Chang | 411/136 |
| 2002/0039522 A1 | * | 4/2002 | Hartmann et al. | 411/161 |

FOREIGN PATENT DOCUMENTS

| | | | | |
|---|---|---|---|---|
| DE | 199 56 287 A | * | 5/2001 | |
| GB | 285030 | * | 8/1928 | 411/544 |

* cited by examiner

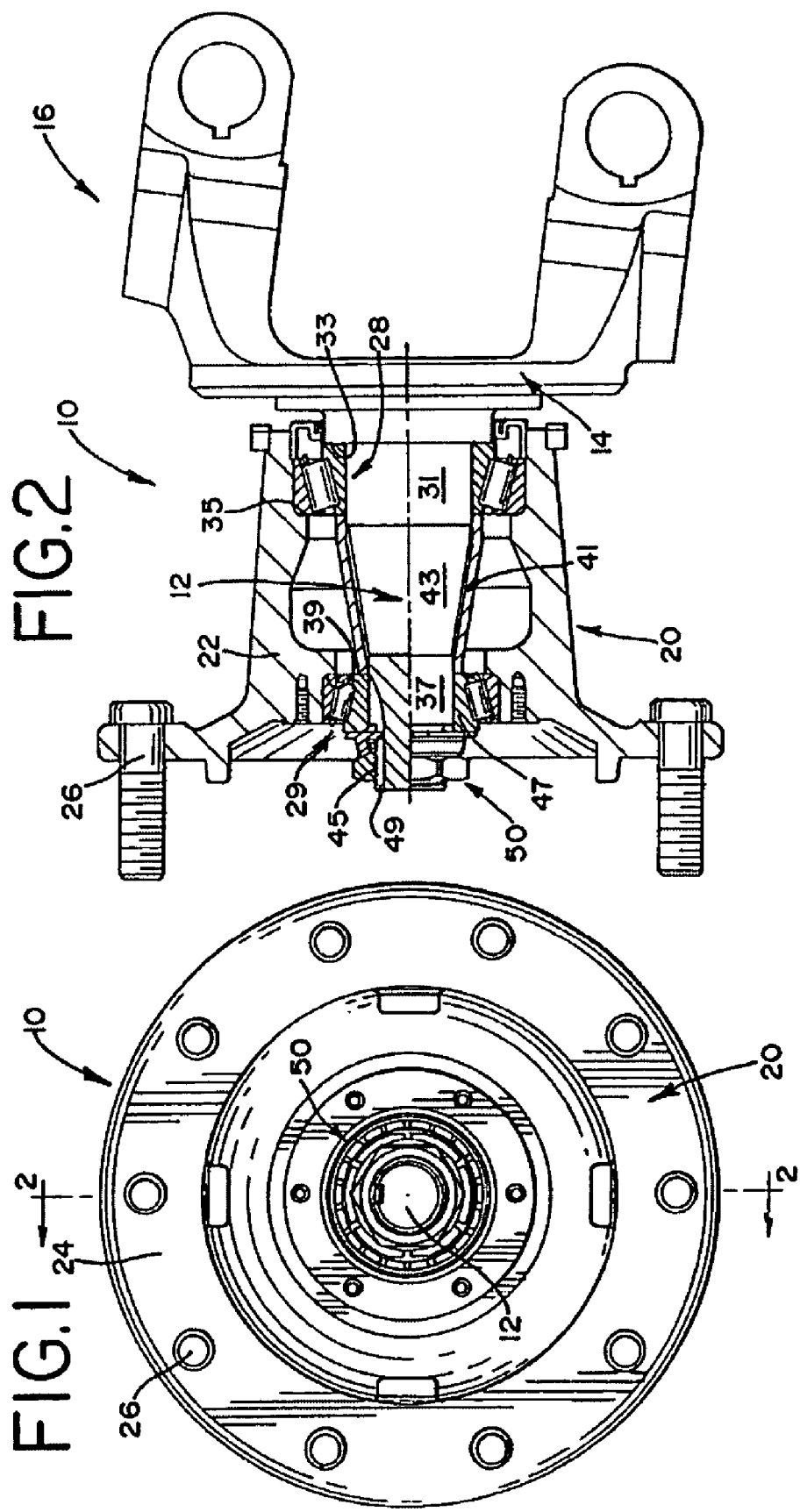

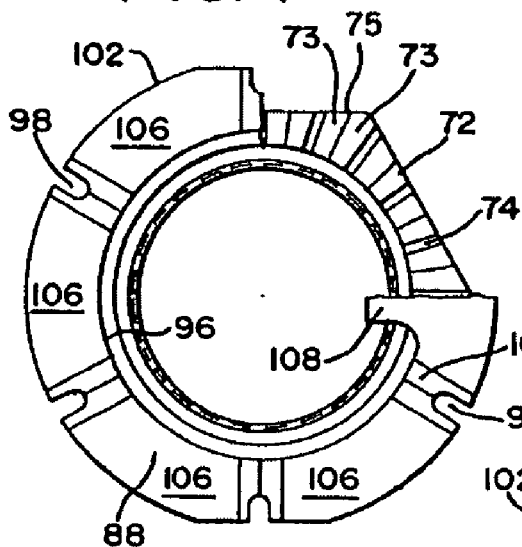
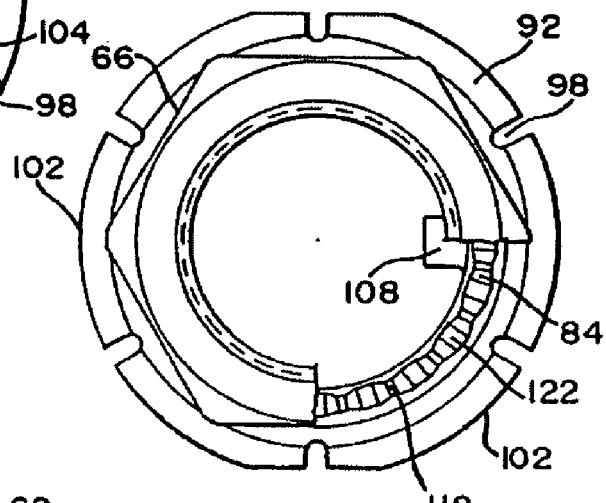
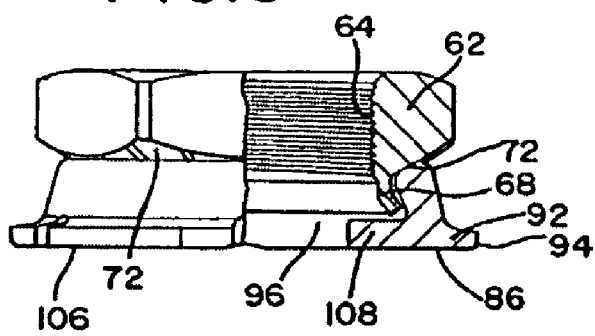
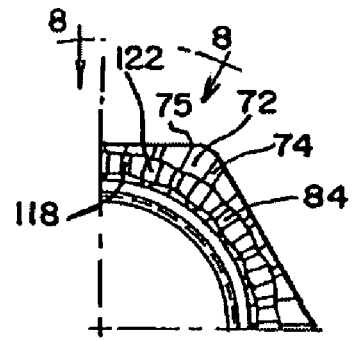
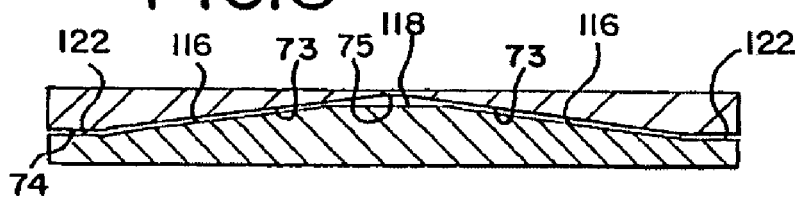

LOCKING FASTENER ASSEMBLY

This is a continuation of application Ser. No. 09/933,312 filed Aug. 20, 2001 now U.S. Pat. No. 6,749,386

FIELD OF THE INVENTION

This invention relates generally to threaded fasteners. It relates particularly to locking fasteners of the type employing a threaded nut and a locking washer.

BACKGROUND OF THE INVENTION

A locking fastener or locking fastener assembly is employed to prevent loosening of a threaded fastener element in a fastener joint. There are numerous types of joints in which locking fasteners or fastener assemblies are not only desirable but necessary to prevent a nut from loosening. One such application is in the axle and wheel nut assembly of a motor vehicle or the like.

In a typical axle and wheel nut assembly, the hub is supported on a spindle by axle bearings which permit the hub, and thus a vehicle wheel, to rotate on the spindle. An axle bearing nut is threaded onto the free end of the spindle and holds the axle bearings and bearing races together in a predetermined relationship. The axle bearing nut must be set in precisely the proper position on the spindle to apply end loading on the bearing races sufficient to avoid excessive play in the bearings but insufficient to overload them, the result of either being possible bearing failure or even loss of a wheel.

Numerous types of nuts with positive locking components are well known. One of the oldest and most common of these is the conventional castellated nut and cotter pin assembly. The disadvantages of these assemblies are numerous. They include the necessity of carefully locating a hole through the axle spindle, of using an extra component, of reduced nut strength, of relatively long installation time and of the difficulties encountered in fine tuning the preload on the bearing races.

Newer developments in locking fastener assemblies include those found in the Anderson, Jr. U.S. Pat. No. 3,762,455, the Grube U.S. Pat. No. 4,812,094, the Burdick U.S. Pat. No. 5,533,849, and the Peterkort U.S. Pat. No. 5,597,278, for example. Of these, the Grube and Peterkort patents are assigned to the same assignee as the present invention, as will be noted.

The Peterkort patent discloses a locking fastener assembly consisting of a flanged nut and a retainer washer loosely seated on the nut's flange. The retainer washer includes a radially inwardly extending tab which is designed to slide axially along a slot in a threaded spindle while preventing the washer from rotating relative to the spindle. A releasable locking clip is positioned to lock the nut to the washer. The locking clip is released by engagement of a wrench socket with a hex-head on the nut so that the nut can be threaded to a desired bearing loading position. When the wrench is removed, the clip interlocks the washer and nut to prevent the nut from rotating.

The aforedescribed Peterkort locking fastener assembly is a highly effective device for use in vehicle wheel assemblies. It is simple and relatively inexpensive. However, its design focuses on limiting end play, not maintaining a constant pre-load.

Other known locking fastener designs include prevailing-torque locking fasteners. Locking action is achieved with frictional resistance induced between mating threads. There is positive resistance to assembly, which maintains throughout fastener seating and tightening. A high residual resistance to loosening remains even if fastener pre-load is lost. Disassembly is even difficult. Complete disengagement in service is highly unlikely. Prevailing-torque fasteners are generally all-metal fasteners with modified threads or fasteners with a separate non-metallic element or one fused to the threads. The former have fewer temperature and environmental limitations than the latter, but the latter do not encounter thread galling and other problems characteristic of the former.

SUMMARY OF THE INVENTION

It is an object of the present invention to provide an improved locking fastener assembly.

It is another object to provide a locking fastener assembly comprising only two components, a nut and a washer.

It is yet another object to provide a locking fastener assembly in which secure locking is achieved between a rotatable nut and a non-rotatable washer without the use of separate locking elements.

It is still another object to provide a locking fastener assembly including a new and improved locking mechanism.

It is a further object to provide a new and improved locking mechanism for a locking fastener assembly wherein a locking relationship is established directly between nut and washer.

It is yet a further object to provide a locking mechanism for a locking fastener assembly wherein a washer and nut interlock is established and a constant bearing load resiliently maintained when the assembly is employed to mount a vehicle wheel.

The foregoing and other objects of the invention are realized in a locking fastener assembly which comprises only a nut and a washer. Each is formed from medium carbon steel.

The washer includes a generally cylindrical washer body and a flange extending radially outward from the base of the body. A clamping surface is formed on the bottom of the flange and washer body base.

The top of the washer body has an annular, generally spherically concave load bearing surface formed on it. The load bearing surface includes an annularly extending series of inclined bearing faces forming a uniform undulation around the entire surface. A series of plateau surfaces between the inclined bearing faces form the upper peaks of the undulation. A series of valley surfaces between the inclined bearing faces form the valleys of the undulation. Each of the plateau and valley surfaces are spherically concave. Each of the inclined bearing faces is also spherically concave. The height of the plateau surface above the valley surface is slightly greater than the clearance between the threads in the nut and those on a vehicle axle spindle, for example, when the locking fastener assembly is in place.

The slightly concave washer body clamping surface on the bottom of the washer forms what approximates a shallow frustum of a cone. This surface is inclined upwardly from the outer periphery of the washer flange of its bottom toward the washer body axis.

The washer flange has a plurality of slots formed inwardly from its outer edge, at regular intervals around the flange. These slots permit intervening flange sections to resiliently flex, albeit only slightly, when the washer clamping surface is forced against an outer bearing race and is under the desired load.

An ear is formed inwardly of the base of the washer body, opposite the flange. The ear is designed to slide axially through a suitably formed slot in the threaded end section of an axle spindle to prevent the washer from rotating relative to the spindle as the nut is threaded onto this end section. In the alternative, a flat may be formed on the spindle and a corresponding flat formed inwardly of the washer body.

The nut includes a generally cylindrical nut body which is internally threaded. A hexagonal surface is formed around the periphery of the nut body to permit gripping the nut with a wrench.

Depending from the nut body is a unitarily formed annular skirt. The skirt is adapted to extend axially into the generally cylindrical body of the washer and then be formed outwardly under an undercut shoulder within the washer body to loosely, but securely, hold the washer and nut together.

The bottom of the nut body, above the skirt, has an annular, generally spherically convex load bearing surface formed on it. The load bearing surface includes an annularly extending series of inclined bearing faces forming a uniform undulation around the entire surface. A series of plateau surfaces between the inclined bearing faces form the lower peaks of the undulation. These plateau surfaces are spherically convex, with the same radius as the valley surfaces on the washer's load bearing surface. Each of the inclined bearing faces is also spherically convex, with the same radius as the bearing faces on the washer's nut bearing surface.

When the nut is threaded onto the axle spindle, the washer is pushed freely in front of it without rotating, until the slightly concave, frusto-conical clamping surfaces engage on the ends of the flange sections the inner bearing race of the outer bearing assembly supporting the wheel hub. Further axial travel of the washer is then resisted by the bearing race, first relatively lightly while the bearing races move closer together and then relatively firmly as the bearing races reach their operating positions.

Meanwhile, the peaks on the opposed undulating load bearing surfaces ride over each other with greater and greater difficulty as the load increases. Finally, they can slip past each other only when the flange sections on the washer begin to resiliently flex. The nut is then securely prevented from counter-rotating and loosening by the interlocking bearing faces and the resilient pressure of the washer.

In locked relationship, the spherically convex plateau surfaces in the load bearing surface of the nut seat flush against corresponding spherically concave valley surfaces in the load bearing surface of the washer. Also, the convex inclined leading bearing faces on the nut seat flush against the concave inclined trailing bearing faces of the washer and prevent the nut from backing off.

BRIEF DESCRIPTION OF THE DRAWINGS

The invention, including its construction and operation, is illustrated more or less diagrammatically in the drawings, in which:

FIG. 1 is an end view of a vehicle axle and wheel hub incorporating a locking fastener assembly embodying features of the present invention;

FIG. 2 is a sectional view taken along line 2—2 of FIG. 1;

FIG. 4 is a bottom plan view of a locking washer assembly, partially in section;

FIG. 5 is a top plan view of a locking washer assembly, partially in section;

FIG. 6 is a side elevational view of a locking washer assembly, partially in section;

FIG. 7 is a plan view of a quarter segment of overlying opposed bearing surfaces on a nut and washer, showing their relationship to each other circumferentially;

FIG. 8 is an enlarged sectional view of an arcuate portion (on an 18° arc in the present illustration) of the mating bearing surfaces in the assembly, the view depicting curved bearing faces and surfaces as straight because of this;

DETAILED DESCRIPTION OF THE PREFERRED EMBODIMENT

Figure 3:
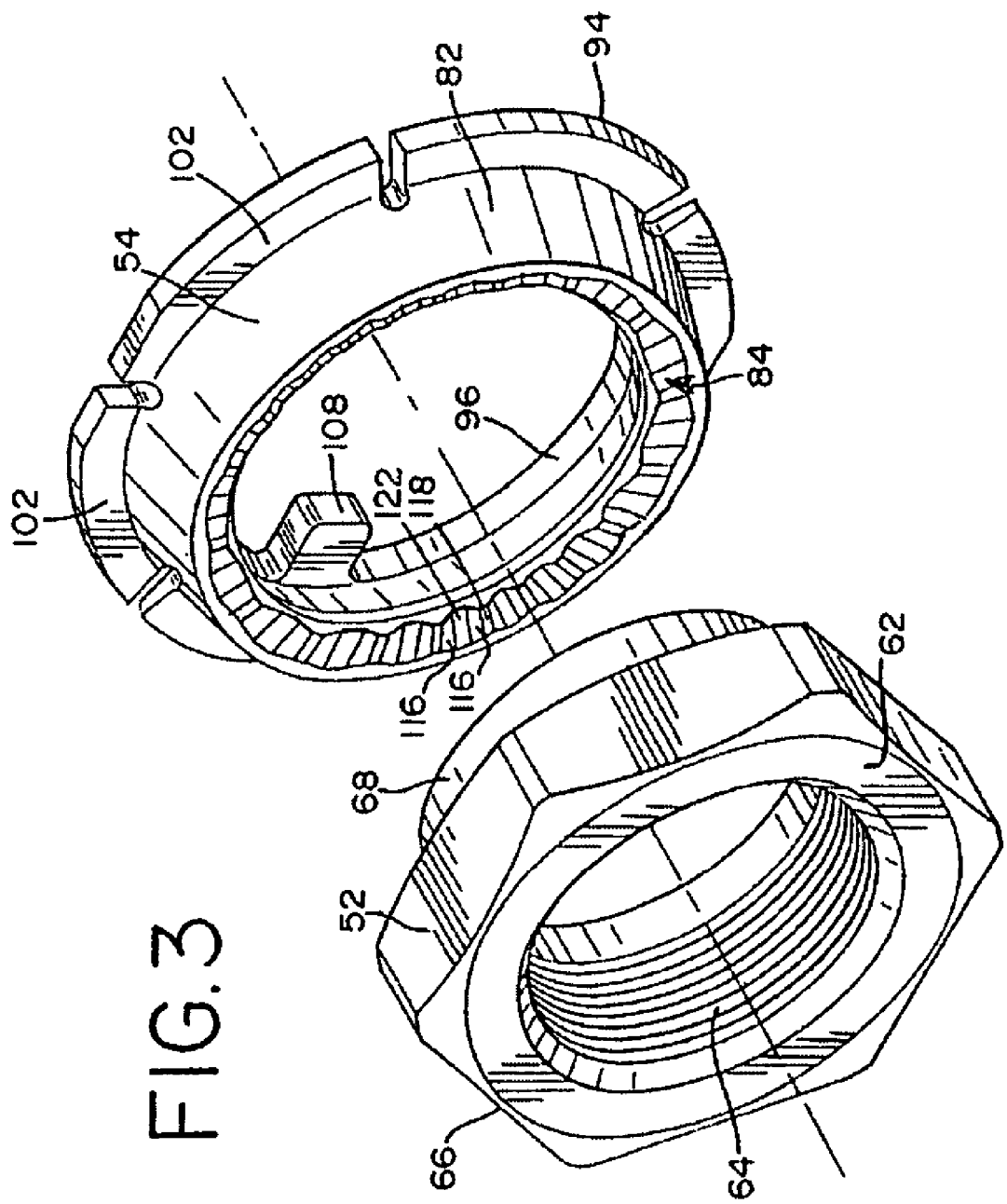
FIG. 3 is an exploded perspective view of a nut and washer in position to be assembled.

Referring to the drawings, and particularly to FIGS. 1 and 2, an axle assembly for an automotive vehicle is shown generally at 10. The axle assembly 10 includes a spindle 12 which extends horizontally from a vertically oriented plate 14. The plate 14 forms the outer face of a fitting 16 which is mounted in a conventional manner on the frame (not shown) of a vehicle.

Seated for rotation on the spindle 12 is a wheel hub 20. The wheel hub 20 includes a generally cylindrical body 22 formed unitarily with a radially extending flange 24. A plurality of studs 26 extend axially from the flange 24 near its periphery. The studs 26 are employed in a conventional manner to mount a wheel (not shown) on the wheel hub 20.

The wheel hub 20 is seated on the spindle 12 on an inner roller bearing assembly 28 and an outer roller bearing assembly 29. The inner bearing assembly 28 is located on a cylindrical inner section 31 of the spindle 12 and is retained between a shoulder 33 on the spindle and an opposing shoulder 35 inside the body 22 of the wheel hub 20. The outer bearing assembly 29 is located on a cylindrical outer section 37 of the spindle 12 and is seated against a shoulder 39 inside the hub body 22 and against a frusto-conical spacer 41 encircling the tapered mid-section 43 of the spindle on the inner end of the bearing assembly.

The outer bearing assembly 29 is held in operating relationship against the shoulder 39 and spacer 41 by a locking fastener assembly 50 embodying features of the present invention. In this regard, the locking fastener assembly 50 is threaded onto the threaded outer end section 45 of the spindle 12 and seats against the inner bearing race 47 of the bearing assembly 29.

The locking fastener assembly 50 is threaded onto the end section 45 of the spindle 12 to take up undesired play in the bearing assemblies 28 and 29 and, accordingly, hold them both in proper operating position and relationship. If the fastener assembly 50 is threaded too snugly against the bearing race 47, the bearing assemblies 28 and 29 will both be over-loaded and their operating life shortened. If the fastener assembly 50 is not threaded sufficiently far onto the end section 45, the bearing assemblies 28 and 29 will have too much play and their operating life will be shortened. The locking fastener assembly 50 is designed to be turned onto the threaded end section 45 of the spindle 12 to a desired position and then held securely in that position by locking forces exerted internally of the assembly according to the invention.

Referring now to FIGS. 3–10, the locking fastener assembly 50 comprises only two components, a nut 52 and a retainer washer 54. Both are forged steel elements. In the preferred embodiment shown here, the nut 52 is formed from medium carbon steel and then heat treated to an average hardness of 33 on the Rockwell C scale. The washer is also formed from medium carbon steel and then heat treated to an average hardness of 39 on the Rockwell C scale.

The nut 52 comprises a nut body 62 which is internally threaded at 64 for receipt of the threaded end section 45 of the spindle 12. Externally, the nut body has a hexagonal shape surface 66 which is adapted to mate with a standard socket wrench for tightening and loosening the nut 52.

Extending generally axially away from the nut body 62 at the inner end of the internal threads 64 is a skirt 68. The skirt 68 extends away from the generally spherically convex load bearing surface 72 of the nut body 62 and through the retainer washer 54. The skirt 68 is formed outwardly in a manner hereinafter discussed so that it retains the washer 54 on the nut 52 in loose relationship.

Figure 9:
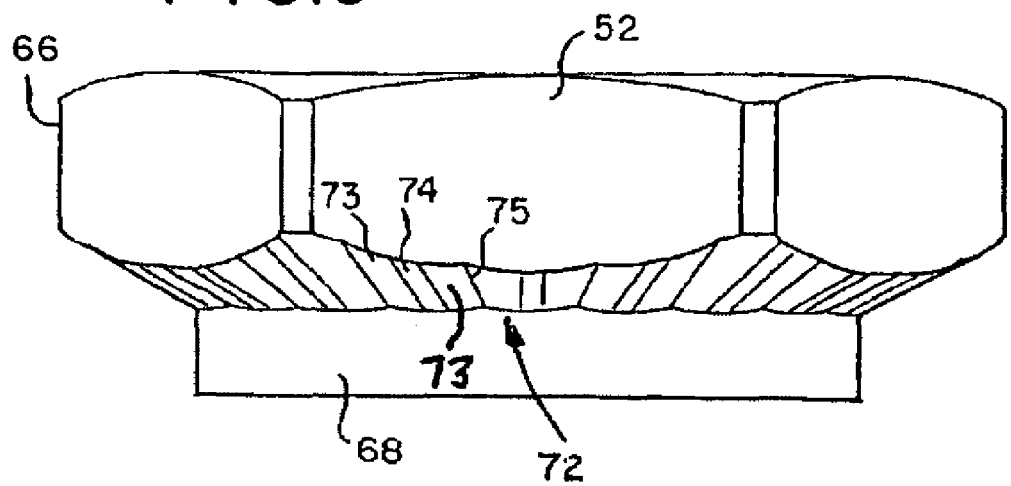
FIG. 9 is a side elevational view of the nut, showing the convex curvature of its inclined bearing faces.

According to the invention, the generally spherically convex load bearing surface 72 on the nut body 62 is, in fact, an annularly undulating surface extending entirely around the nut body, as best seen in FIG. 9. The surface 72, which will hereinafter be described in greater detail, may be formed using any desired technique but, in the present instance, is formed by cold forging using a die insert which is machined to the desired complex curvature shape using conventional ball end mill techniques.

The washer 54 comprises an annular washer body 82 having a generally spherically concave load bearing surface 84 at its inner end and a clamp surface 86 for engaging the aforedescribed inner bearing race 47 at its outer end. The clamp surface 86 is formed on the outer end face 88 of the body 82 and a washer flange 92 which encircles it.

Figure 10:
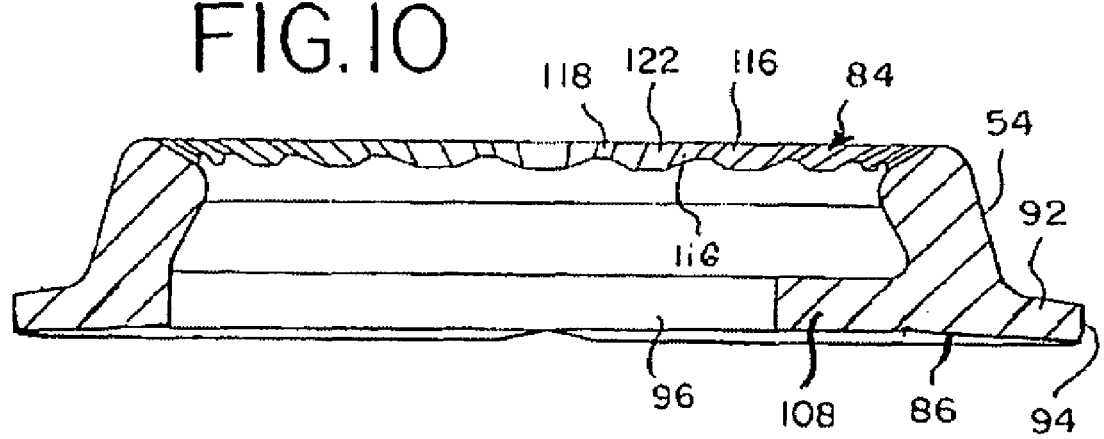
FIG. 10 is a side sectional view through the washer, showing the concave curvature of its inclined bearing faces.

The generally spherically concave load bearing surface 84 on the inner end of the washer body 82 is also an angularly undulating surface extending entirely around the washer body, as best seen in FIG. 10. The surface 84, which will hereinafter be described in greater detail, is also formed by cold forging using a die pin which is machined on one end to the desired complex shape using conventional ball end mill techniques.

The outer end face 88 of the body 82 and flange 92 on the washer body 82 is slightly frusto-conical in shape. The end face 88 is inclined upwardly at an angle of approximately 3" from the outer periphery 94 of the flange to the inner periphery 96 of the body 82.

The flange 92, which is approximately 0.12 inches (3.0 mm) thick in the washer 54 illustrated, is segmented by six cut-outs 98 around its circumference so as to define six radially extending flange sections 102. The end face 88 is also interrupted by six Vee-shaped, depressions 104 extending radially inwardly from corresponding cut-outs 98. This effectively separates the annular clamp surface 86 into six arcuate clamp surface segments 106, the arcuate outer extremities of which, between cut-outs 98, are able to resiliently flex axially of the washer 54. Although the flange 92 is shown here separated into six flange sections 102, however, it should be understood that the invention contemplates using a greater or lesser number depending upon the size of the washer and thickness of the flange.

Extending radially inwardly from the end face 88 is an ear 108. The ear 108 is of a size and shape suitable to slide loosely in an axially elongated slot 49 formed on one side of the threaded end sections 45 of the spindle 12. As will hereinafter be further discussed, when the fastener assembly 50 is installed, the ear 108 and slot 49 cooperate to prevent rotation of the washer 54 relative to the spindle 12. Although the use of ear 108 and slot 49 cooperating to prevent washer 54 rotation is shown here in the context of vehicle hub 20 mounting, it should also be understood that the invention contemplates the use of other conventional means for preventing washer rotation.

Referring now in greater detail to the generally spherically convex load bearing surface 72 on the nut body 62, it comprises a series of oppositely inclined side bearing faces, 73 with peaks in the form of plateau surface segments 74 and with narrow valley bottoms at lines 75. Each pair of side bearing faces 73 with a valley floor line 75 between them forms what approximates an inverted Vee shape.

The plateau surface segments 74 are formed in the cold forging process so that they are all convex and lie on the surface of an imaginary sphere whose center is on the axis of the nut body 62. In the nut 52 which is illustrated, and which has an outside diameter between flats of the hexagon of approximately 2.125 inches (54 mm) and a nut body 62 thickness of approximately 0.50 inches (12.7 mm), the radius of that sphere is 2.00 inches (50.8 mm).

Each inclined side bearing face 73 is also formed so that it is convex and is curved both radially and circumferentially of the nut body 62. As will hereinafter be described, these convex surfaces 73 are formed so as to be complementary with corresponding concave side bearing faces in the generally spherically concave load bearing surface 84 on the washer body 82.

In the nut body 62 illustrated, the height of each plateau surface segment 74 formed by adjacent side bearing faces 73, i.e., the vertical height from the valley floor lines 75, is 0.015 inches (0.38 mm). According to the invention, and for reasons hereinafter discussed, this height is slightly greater than the clearance between the threads on the end section 45 of the spindle 12 and the threads 64 in the nut body 62 when they are assembled.

Referring now in greater detail to the generally spherically concave load bearing surface 84 on the washer body 82, the surface comprises a uniform series of inclined side bearing faces 116 with peaks in the form of plateau surfaces 118 and with wider valley floors in the form of valley surfaces 122. Each pair of inclined bearing faces 116 with a valley surface 122 forms what approximates a Vee shape.

The valley floor surfaces 122 are formed in the forging process so that they are all concave and lie on the surface of an imaginary sphere whose center is on the axis of the washer body 82. The radius of that sphere is 2.00 inches (50.8 mm). As such, it will be seen that the plateau surface segments 74 on the nut body 62 are perfectly complementary in shape to the valley floors 122 on the washer body 82.

In the washer body 82 illustrated, the height of each plateau surface segment 118, i.e., the vertical height from the valley floor 122, is slightly less than 0.015 inches (0.38 mm). As a result, when nut 52 and washer 54 are seated against each other in nested relationship, each plateau surface segment 74 will seat uniformly on a corresponding valley floor 122 while opposed inclined bearing faces 73 and 116 will be slightly separated.

When the opposed bearing surfaces, surface 72 on the nut body 62 and surface 84 on the washer body 82, are nested in locking relationship, however, the trailing inclined bearing faces 116 of the washer body 82 seat against the leading inclined bearing faces 73 on the nut body 62. Because these opposed inclined bearing faces 73 and 116 are formed so as to be complementarily convex and concave, respectively, and all their radii of curvature axially of the assembly 50 and from its axis equal those of the aforementioned valley floor surfaces 122, locking surface contact is maintained between them even if the nut 52 and washer 54 are not precisely parallel to each other because the nut does not thread perfectly squarely onto the spindle.

The nut 52 and washer 54 are assembled to create the locking fastener assembly 50 by inserting the skirt 68 of the nut through the washer in the manner best seen in FIG. 6. The skirt 69 is then dimpled outwardly by forming at six evenly spaced locations 69 around its periphery so as to underlie an annular inward projection 83 in the washer body and, accordingly, loosely but securely connect the nut 52 and washer 54 while permitting the nut to rotate freely relative to the washer.

In use for securing a wheel hub 20 on the spindle 12 in an axle assembly 10 for a truck or some other vehicle, for example, after a wheel hub 20 has been seated on its supporting bearing assemblies 28 and 29, a fastener assembly 50 is slipped over the threaded end section 45 of the spindle 12 so that the ear 108 in the washer 54 slides along the slot 49 in the spindle until the internal threads 64 in the nut body 62 engage the external threads on the spindle. The nut 52 is then threaded onto the spindle 12 by hand until the clamp surface 86 on the washer body 82 engages the inner bearing race 47. As the nut 52 rotates while being threaded onto the spindle 12 in this way, the washer 54 moves axially with it but is prevented from rotating because its ear 108 is axially slidable in, but rotationally fixed by, the slot 49 in the spindle.

As the nut 52 rotates, its undulating bearing surface 72 slips easily over the opposed undulating bearing surface 84 on the washer 54 as the nut pushes the washer before it. When the clamp surface 86 engages the inner bearing race 47, however, further rotation of the nut is resisted with greater and greater effect by the interlocking effect of the opposed inclined side bearing faces on the nut 52 and washer 54, respectively, as the nut turns and axial pressure builds up in the bearing assemblies 28 and 29. As this pressure builds up, the flange sections 102 begin to flex, creating a resilient force tending to keep the inclined bearing faces of opposed side bearing surfaces 72 and 84 in interlocked relationship.

The flange sections 102 are designed to resiliently flex through an axial distance which is slightly greater than the clearance between the spindle 12 threads and nut body 62 threads. Because the flange sections 102 are able to flex slightly more than this clearance, the washer 54 can move axially under load to some degree without degradation of the lock between washer 54 and nut 52. At the same time, because the height of the plateau surface 118 above the valley surface 122 in the washer body 82 is slightly greater than the clearance also, once a locking relationship is established with the proper preload the nut 52 and washer 54 can move slightly relative to each other without loosening the fastener assembly 50.

When a predetermined torque setting is reached in turning the nut 52 of the locking assembly 50 onto the spindle 12, the bearing assemblies 28 and 29 are properly preloaded. The locking assembly 50 can then be relied upon to resist all axial forces tending to cause the nut 52 to back off. Increased axial load from the wheel hub 20 merely causes the nut 52 and washer 54 to become more securely locked together against relatively rotation. Only by applying loosening torque to the nut 52 again, as with a hex wrench, can the locking assembly 50 be removed.

Although the invention in a locking fastener assembly has been described in the context of a vehicle wheel hub mounting arrangement, it should be understood that it might be otherwise employed. Its two-part simplicity, rugged construction, virtually fail-proof action and low manufacturing cost may make it very attractive in many applications.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

The invention claimed is:

1. A locking fastener assembly, comprising:
 a) a fastener and a washer rotatable relative to each other about a common axis:
 b) an annular washer bearing surface on said fastener and an annular fastener bearing surface on said washer, said annular bearing surfaces being axially opposed to each other;
 c) each of said annular bearing surfaces including a plurality of inclined bearing faces oriented circumferentially and forming portions of an undulating annular bearing surface;
 d) said inclined bearing faces being opposed to each other on respective fastener and washer and being curved both radially and circumferentially of said assembly and complementary to each other; and
 e) a clamping surface on said washer.

2. The locking fastener assembly of claim 1 further characterized in that:
 a) said inclined bearing faces which are opposed to each other on respective fastener and washer are spherically convex and concave, respectively, on substantially identical radii from substantially the same center.

3. A Locking fastener assembly, comprising:
 a) a threaded fastener, including an annular skirt;
 b) a washer including an annular washer body provided with a flange extending radially outwardly therefrom;
 c) said annular skirt extending loosely through said washer whereby said fastener is freely rotatable relative to said washer before said fastener assembly is mounted;
 d) an annular washer beating surface on said fastener and an annular fastener bearing surface on said washer;
 e) said washer bearing surface on said fastener being convex and including a series of shallow peaks and valleys extending around said washer bearing surface so as to create undulations including annularly inclined bearing faces;
 f) said fastener bearing surface on said washer being concave and including a series of shallow peaks and valleys extending around said fastener bearing surface so as to create undulations including annularly inclined bearing faces;
 g) said flange including an annular clamping surface thereon and being capable of flexing slightly axially of said washer body; and
 h) said inclined bearing faces each being generally spherical in shape and complementary to each other when seated in locking relationship against each other.

4. A locking fastener assembly, comprising:
 a) a fastener and a washer connected to each other in such a manner that they can be rotated relative to each other about a common axis;
 b) an annular washer bearing surface on said fastener and an annular fastener bearing surface on said washer, said annular bearing surfaces being axially opposed to each other;

c) each of said annular bearing surfaces including a plurality of inclined bearing faces oriented circumferentially and forming an undulating annular bearing surface;
d) one of said annular bearing surfaces including plateaus between alternating pairs of adjacent inclined bearing faces;
e) the other of said annular bearing surfaces including valley floors between alternating pairs of adjacent inclined bearing faces; and
f) said plateaus and floors being segmentally spherical about a common center when said assembly is in locking relationship.

5. A locking fastener assembly, comprising:
a) a nut and a washer rotatable relative to each other about a common axis;
b) an annular washer bearing surface on said nut and an annular nut bearing surface on said washer, said annular bearing surfaces being axially opposed to each other;
c) each of said annular bearing surfaces including a plurality of inclined bearing faces oriented circumferentially and forming portions of an undulating annular bearing surface;
d) a damping surface on said washer;
e) said washer including a washer body and a flange extending radially outwardly from said washer body;
f) at least a portion of said damping surface being formed on said washer flange;
g) said washer flange comprising a series of flange segments extending annularly around said washer body;
h) said flange segments being slightly flexible axially of said washer; and
i) said flange segments being separated by radial slots in said flanges.

6. The locking fastener assembly of claim 5 further characterized in that:
a) said clamping surface has a generally vee-shaped depression formed therein substantially in radial alignment with each of said slots.

7. A combination of an axle assembly including a spindle, a bearing assembly seated on said spindle and a locking fastener assembly retaining said bearing assembly on said spindle, comprising:
a) external threads on said spindle;
b) a nut, including a nut body including an annular skirt depending therefrom, said nut including internal threads therein;
c) a washer including an annular washer body including a flange extending radially outwardly therefrom;
d) said annular skirt extending loosely through said washer whereby said nut is freely rotatable relative to said washer before said fastener assembly is mounted on said spindle;
e) an annular washer bearing surface on said nut body and an annular nut bearing surface on said washer body;
f) said washer bearing surface on said nut body being convex and including a series of shallow peaks and valleys extending around said nut body so as to create undulations including annularly inclined bearing faces;
g) said nut bearing surface on said washer body being concave and including a series of shallow peaks and valleys extending around said washer body so as to create undulations with annularly inclined bearing faces;
h) said flange including an annular clamping surface thereon and being capable of flexing slightly axially of said washer body;
i) the height of the peaks in one of said washer bearing surface and said nut bearing surface being greater than the height of the peaks in the other of said washer bearing surface and said nut bearing surface; and
j) said height of the peaks in one of said washer bearing surface and said nut bearing surface also being greater than the clearance between said threads when said locking assembly is threaded onto said spindle to lock said beating assembly on said spindle.

8. A locking fastener assembly, comprising:
a) a fastener and a washer rotatable relative to each other about a common axis;
b) an annular washer beating surface on said fastener and an annular fastener bearing surface on said washer, said annular bearing surfaces being axially opposed to each other;
c) each of said annular bearing surfaces provided with a generally spherically curved shape and a plurality of inclined bearing faces that form an undulating surface located at least partially around each of said annular beating surfaces, said inclined bearing faces being opposed to each other on the respective fastener and washer; and
d) a damping surface on said washer.

9. The locking fastener assembly of claim 8 further characterized in that:
a) the annular bearing surface on the fastener is provided with a spherically curved shape that is generally convex and the annular beating surface on the washer is provided with a spherically curved shape that is generally concave.

* * * * *